United States Patent [19]
Quadir et al.

[11] Patent Number: 5,209,885
[45] Date of Patent: May 11, 1993

[54] AQUEOUS EXTRUSION OF SILICON NITRIDE

[75] Inventors: Tariq Quadir, Columbia, Md.; Ahmad Arfaei, Milford, N.H.

[73] Assignee: W. R. Grace & Co.-Conn., New York, N.Y.

[21] Appl. No.: 724,558

[22] Filed: Jun. 28, 1991

[51] Int. Cl.$^5$ ............................................. C04B 35/58
[52] U.S. Cl. ..................................... 264/63; 264/109; 264/177.11; 264/211.11
[58] Field of Search ................ 264/63, 177.11, 211.11, 264/109

[56] References Cited

U.S. PATENT DOCUMENTS

| | | | |
|---|---|---|---|
| 4,814,014 | 3/1989 | Arfaei | 106/90 |
| 4,906,424 | 3/1990 | Hughes | 264/63 |
| 4,908,172 | 3/1990 | Sterzel | 264/63 |
| 4,965,039 | 10/1990 | Schuetz | 264/211.11 |
| 5,030,599 | 7/1991 | Quadir | 501/97 |

Primary Examiner—James Derrington
Attorney, Agent, or Firm—Steven Capella

[57] ABSTRACT

A water-based silicon nitride powder extrusion mixture is prepared. The mixture also contains oleic acid, glycerin, methyl cellulose and a polyacrylic acid-containing polymer. The mixture can be extruded at ambient temperatures. The extrudate can be dried at low temperature and sintered to form a dense silicon nitride part.

17 Claims, No Drawings

AQUEOUS EXTRUSION OF SILICON NITRIDE

FIELD OF THE INVENTION

This application concerns aqueous extrusion of ceramic powders, especially silicon nitride powders, to form green bodies and the sintering of such green bodies.

BACKGROUND OF THE INVENTION

Ceramic articles (especially dense ceramic articles) are typically formed from a starting ceramic powder. The ceramic powder is formed into a shape using some suitable molding technique. The shape is then treated to form the desired ceramic article. For dense ceramic articles, such treatment includes a heat treatment to densify the shape.

Ceramic powders by themselves are generally unsuitable for molding into shapes because they have insufficient cohesive strength. Accordingly, binders and other molding aids are often combined with the ceramic powder (prior to molding) to facilitate molding of the powder as well as to add strength to the molded shape. The binders and/or molding aids are then removed in a later processing step usually involving heating to cause reaction and/or volatilization of those materials.

Goals of the molding step are to produce a molded shape which precisely conforms with the shape of the mold and to do so as reliably and inexpensively as possible. The molded shape should have sharp corners if the mold is designed to produce sharp corners. The shape should also be smooth and substantially free of cracks and tears.

For silicon nitride powders, the usual molding techniques are injection molding or hot extrusion. These processes are quite expensive (often requiring elevated temperatures and/or elaborate equipment) and require the use of relatively large amounts of organic binders and molding aids. Additionally, the large amount of these binders and aids often difficult to completely remove from the molded shape. Accordingly, there is need for improved molding methods and mixtures for molding.

SUMMARY OF THE INVENTION

The invention provides improved molding compositions and techniques which overcome the problems of the prior art molding techniques.

In one aspect, the invention provides a method of extruding a silicon nitride powder mixture, the method comprising:
a) mixing polyacrylic acid-containing polymer, water, glycerin and oleic acid to form an aqueous solution;
b) mixing silicon nitride powder with methyl cellulose to form a powder mixture;
c) combining the solution and the powder mixture to form an extrusion mixture; and
d) extruding the extrusion mixture to form an extrudate.

In a further aspect, the invention encompasses a method of forming a sintered silicon nitride body, the method comprising:
a) mixing polyacrylic acid-containing polymer, water, glycerin and oleic acid to form an aqueous solution;
b) mixing silicon nitride powder with methyl cellulose to form a powder mixture;
c) combining the solution and the powder mixture to form an extrusion mixture; and
d) extruding the extrusion mixture to form an extrudate.
e) drying the extrudate.
f) sintering the dried and extrudate to form a dense silicon nitride body.

The invention also embraces a silicon nitride composition adapted to be extruded into shapes, the composition comprising:
a) silicon nitride powder,
b) methyl cellulose,
c) polyacrylic acid polymer,
d) glycerin,
e) oleic acid, and
f) water.

The polyacrylic acid-containing polymers are preferably graft copolymers. The extrusion is preferably performed at ambient temperature. These and other aspects of the invention are further discussed below.

DETAILED DESCRIPTION OF THE INVENTION

The processes of the invention all involve the steps of (A) forming an extrusion composition and (B) extruding the composition to form a molded shape.

The composition to be extruded contains polyacrylic acid-containing polymer, glycerin, oleic acid, water, methyl cellulose and silicon nitride powder.

To achieve the desired extrusion molding properties, the composition to be extruded is preferably formed according to the following steps:
a) mixing the polyacrylic acid-containing copolymer, water, glycerin and oleic acid to form an aqueous solution;
b) mixing the silicon nitride powder and methyl cellulose to form a powder mixture; and
c) combining the solution and powder mixture to form the composition to be extruded.

The mixing in step a) is preferably vigorous so as to form a homogeneous solution. Suitable mixing techniques for step a) may be shaking, high speed mixing etc. The powder mixing of step b) may be performed using any conventional dry mixing means. Additional materials such as sintering aids for the silicon nitride may be incorporated into the powder mixture. The invention is not limited to the use of any particular sintering aid or combination of sintering aids, however, the sintering aids described in U.S. Pat. No. 5,030,599 are generally preferred.

The extrusion mixture composition preferably contains the following approximate proportions of ingredients in parts by weight:
0.10–0.65 polyacrylic acid-containing polymer
0.50–1.0 oleic acid
0.10–2.0 glycerin
14.0–18.1 water
2.8–3.0 methyl cellulose
75–80 silicon nitride powder.

The polyacrylic acid-containing polymer is preferably a graft copolymer such as those described in U.S. Pat. No. 4,814,014. Virtually any methyl cellulose can be used. A preferred methyl cellulose is sold by Dow Chemical under the name METHOCEL ® 20-214. The silicon nitride powder may be any known powder. Virtually any particle size powder can be used for extrusion purposes. One may wish to use a powder having good sintering characteristics if one desires to produce a sintered body.

The pH of the mixture will vary depending on the proportions of ingredients used. Generally, a pH of about 2.5-3.5 is preferred, more preferably about 3.0.

Once the extrusion mixture has been formed, it may be extruded using conventional extrusion equipment such as a ram extruder. The extrusion is preferably conducted at ambient temperature. The resulting extrudate is then recovered.

Preferably, the extrudate is then dried at about 50°-100° C. to remove most of the water. The dried extrudate may then be densified (sintered) using any conventional technique such as pressureless sintering or hot isostatic pressing. A heating step to remove organic materials may be employed prior to or as part of the densification step. Typical sintering temperatures are at least about 1600° C., preferably about 1650° C.-1800° C. with about 1760° C. being most preferred. For pressureless sintering, sintering times of about 2-4 hours and a 1 atm. $N_2$ atmosphere are preferred.

The invention is further illustrated by the following example. It should be understood that the invention is not limited to the ingredients, process conditions or results recited in the example.

EXAMPLE 1

An extrusion composition having the formulation recited in Table 1 was prepared by the procedure described below.

TABLE 1

| Component | Amount (gms) |
| --- | --- |
| Silicon Nitride (with sintering aids) | 13620 |
| Methyl Cellulose | 504 |
| Deionized Water | 2449 |
| Polyacrylic Acid Polymer | 27 |
| Oleic Acid | 126 |
| Glycerin | 280 |

The polyacrylic acid polymer (of U.S. Pat. No. 4,814,014) was combined with the water and glycerin to form a solution. The oleic acid was added to this solution, and the solution was shaken vigorously to obtain homogeneity. In a separate batch, the silicon nitride powder was dry mixed with the methyl cellulose (Methocel ® 20-214) for about 10 minutes using a water-cooled Sigma blade mixer. (The silicon nitride powder included about 10 wt. % $La_2O_2$-$CeO_2$-$Nd_2O_3$ sintering aid as well as 5 wt. % alumina sintering aid, these percentages being based on the total silicon nitride-sintering aid mixture.) The solution was then added to the powder mixture, and the combination was mixed for an additional 14 minutes in the Sigma blade mixer to produce the extrusion mix. The mix had a pH of about 3.0.

The extrusion mix was extruded through an extruder at a force of less than one ton to form extruded parts. The extruded parts had dovetails which were well defined. The extruded surfaces were very smooth with no tears or cracks. The parts were then dried at 50° C., for about 24 hours in a Blue M oven to produce parts ready for sintering.

The parts were then pressureless sintered in 1 atm. $N_2$ at about 1760° for about 2-4 hours. The densified parts were excellent in appearance. The parts had at least 95% of theoretical density with hardness values of about 1700 kg/mm². The modulus of rupture values ranged from about 80 to 95 Ksi.

What is claimed is:

1. A method of extruding a silicon nitride powder mixture, said method comprising:
   a) mixing polyacrylic acid-containing polymer, water, glycerin and oleic acid to form an aqueous solution;
   b) mixing silicon nitride powder with methyl cellulose to form a powder mixture;
   c) combining said solution and said powder mixture to form an extrusion mixture; and
   d) extruding said extrusion mixture to form an extrudate.

2. The method of claim 1 further comprising step
   e) drying said extrudate.

3. The method of claim 1 wherein said extrusion is conducted at ambient temperature.

4. The method of claim 1 wherein said extrusion mixture has a pH of about 2.5-3.5.

5. The method of claim 4 wherein said pH is about 0.3.

6. The method of claim 1 wherein said powder mixture additionally contains one or more sintering aids.

7. The method of claim 1 wherein said extrusion mixture contains about 75-80 wt. % silicon nitride powder.

8. The method of claim 1 wherein the solution of step a) is formed by vigorous mixing.

9. The method of claim 1 wherein the aqueous solution contains:
   0.10-0.65 parts by wt. polyacrylic acid-containing polymer
   0.5-1.0 parts by wt. oleic acid
   0.1-2.0 parts by wt. glycerin
   14.0-18.1 parts by wt. water 10. The method of claim 9 wherein said solution consists essentially of the ingredients recited in claim 9.

11. The method of claim 1 wherein said extrusion step d) is performed by placing the extrusion mixture into a ram extruder and recovering the resulting extrudate.

12. The method of claim 2 wherein said drying is performed at about 50°-100° C.

13. A method of forming a sintered silicon nitride body, said method comprising:
    a) mixing polyacrylic acid-containing polymer, water, glycerin and oleic acid to form an aqueous solution;
    b) mixing silicon nitride powder with methyl cellulose to form a powder mixture;
    c) combining said solution and said powder mixture to form an extrusion mixture; and
    d) extruding said extrusion mixture to form an extrudate.
    e) drying said extrudate.
    f) sintering said dried and extrudate to form a dense silicon nitride body.

14. The method of claim 13 wherein said sintering comprises pressureless sintering at about 1650° C.-1800° C.

15. The method of claim 14 wherein said sintering is performed at about 1760° C.

16. The method of claim 14 wherein said sintering is performed for about 2-4 hours.

17. The method of claim 1 wherein said polymer is a graft copolymer.

* * * * *